United States Patent [19]

Kim

[11] 4,175,109

[45] Nov. 20, 1979

[54] PROCESS FOR EXTRACTING TUNGSTEN FROM ALKALI METAL TUNGSTATE SOLUTIONS

[75] Inventor: Tai K. Kim, Towanda, Pa.

[73] Assignee: GTE Sylvania Incorporated, Stamford, Conn.

[21] Appl. No.: 930,784

[22] Filed: Aug. 3, 1978

[51] Int. Cl.² ............................................. C01G 41/00
[52] U.S. Cl. ............................ 423/54; 423/DIG. 14; 75/101 BE
[58] Field of Search .............. 423/54, 658.5, DIG. 14; 75/101 BE

[56] References Cited

U.S. PATENT DOCUMENTS

| | | | |
|---|---|---|---|
| 3,052,516 | 9/1962 | Drobnick et al. | 423/54 |
| 3,158,438 | 11/1964 | Kurtak | 423/54 |
| 3,770,869 | 11/1973 | Kim et al. | 423/54 |
| 3,804,941 | 4/1974 | Coad et al. | 423/54 |
| 4,092,400 | 5/1978 | Zbramek et al. | 423/54 |

FOREIGN PATENT DOCUMENTS 456791  11/1972  U.S.S.R. ..................................... 423/54

OTHER PUBLICATIONS

Coleman, "Nuclear Science & Engineering", vol. 17, 1963, pp. 274-286.

*Primary Examiner*—Herbert T. Carter
*Attorney, Agent, or Firm*—Donald R. Castle

[57] ABSTRACT

A tungsten extraction process wherein tungsten values are extracted from an aqueous alkali metal tungstate solution by an organic extractant, then stripped from the extractant is improved by using an organic solution consisting essentially of from about 6 to about 10 percent by volume an extractant that is a mixture of trialkyl amines wherein the major constituent is tri-isooctyl amine and from about 90 to about 94 percent by volume of a solvent that is a mixture of alkyl benzenes having molecular weights of either 120, 134 or 148.

2 Claims, No Drawings

PROCESS FOR EXTRACTING TUNGSTEN FROM ALKALI METAL TUNGSTATE SOLUTIONS

BACKGROUND OF THE INVENTION

1. Field of the Invention

This invention relates to the extraction and purification of tungsten values from aqueous alkali metal tungstate solutions. More particularly it relates to a two component extractant solution useful for extracting and purifying tungsten values from an aqueous caustic solution.

2. Prior Art

Extraction of tungsten by amines has been known for a number of years as reported by Coleman, C. F., et al., "Amines as Extractants," Nuclear Science and Engineering, Vol. 17, 274–286, 1963 and C. R. Kurtak in U.S. Pat. No. 3,158,438, 1964 describes an integrated solvent extraction process using an amine. A long chain aliphatic alcohol is used as a phase conditioner (or solubilizer). P. Coad in U.S. Pat. No. 3,804,941 describes tungsten recovery from an aqueous alkaline brines solution using quaternary amine. Tungsten recovery from low grade concentrates containing low concentration of tungsten using a primary amine and a quaternary amine—is reported in Investigation 6845, U.S. Department of the Interior. More recently a tricaprylyl amine, tributyl phosphate and kerosene system has been used. A preferred kerosene is a material sold under the trade name Kermac 470B by Kerr-McGee. In the above system tributyl phosphate is essential for the amine-tungsten-complex to remain soluble in the organic extractant solution. Without tributyl phosphate the complex is insoluble and the system cannot be operated. Generally a solution containing from about 10 to about 14 percent by volume of the tricaprylyl amine, from about 10 to about 14 percent by volume of tributyl phosphate and the balance kerosene is used.

While the tricaprylyl amine-tributyl phosphate-kerosene system provides satisfactory recovery of tungsten it does have some disadvantages. In addition to the necessity of using tributyl phosphate to provide solubility for the amine-tungsten complex, sodium is extracted along with the tungsten. In addition, tributyl phosphate hydrolyzes to produce di-n-butyl phosphoric acid and mono-n-butyl phosphoric acid. These acids extract cationic impurities. It is also necessary in the above extraction system to add heat.

It is believed, therefore, that a solvent system that does not use tributyl phosphate, has a higher throughput capability can be operated without addition heat and provides a product relatively free of sodium is an advancement in the art.

SUMMARY OF THE INVENTION

In accordance with one aspect of this invention there is provided an extractant media consisting essentially of an extractant which is a mixture of trialkyl amines having tri-isooctyl amine as its major constituent and a solvent consisting essentially of a mixture of alkyl benzenes having molecular weights of either 120, 134 or 148. The amine extractant is from about 6 to about 10 percent by volume of the total extractant solution and the balance is the solvent.

DETAILS OF THE PREFERRED EMBODIMENTS

For a better understanding of the present invention, together with other and further objects, advantages and capabilities thereof, reference is made to the following disclosure and appended claims in connection with the above description of some of the aspects of the invention.

The amine extractant is primarily tri-isooctyl amine, however, the amine does contain other tertiary amines having alkyl chains containing from about 6 to about 10 carbon atoms. Suitable amines are Adogen 381, a tradename of Ashland Chemical Company and Alamine 308, a tradename of General Mills. Both manufacturers state that the material is primarily tri-isooctyl amine, however, chromatograms show that the material does contain a variety of alkyl amines having alkyl chains that contain from about 6 to about 10 carbon atoms.

The organic solvent is a mixture of alkyl benzenes having molecular weights of either 120, 134 or 148. Typical constituents include trimethyl benzene, ethyl benzene, dimethylethyl benzene, methyl propyl benzene, tetramethyl benzene, diethyl toluene, dimethylisopropyl benzene and the like. The material is sold under the tradename SC #150 by Buffalo Solvents and Chemical Corporation. In the 1972 edition of *Organic Solvents*, a trade publication of Buffalo Solvents and Chemical Corporation, SC #150 is listed as having a boiling point range of from 188° C. to 210° C, a Flash Point of 151° F. and a specific gravity of about 0.891. As previously stated the molecular weight of the alkyl benzenes contained in SC #150 are 120, 134 or 148 thus the total carbon atoms in the alkyl chain attached to the benzene ring are either 3, 4 or 5.

From about 6 to about 10 percent by volume of the above trialkyl amine with the balance SC #150 can be used, although about 8 percent by volume is preferred. Lower than about 6 percent of the amines result in excessive processing time while greater than about 10 percent by volume does not improve results and adds costs to the extraction process.

Analysis of the ammonium tungstate stripped from the amine shows that the sodium level is 18 times lower than the level attained by the prior process and that the levels of phosphorus and arsenic are reduced below that obtained by the prior process, that is the tricaprylyl amine-tributyl phosphate-kerosene system.

It has also been found that the throughput of the present system is higher than with the tricaprylyl amine-tributyl phosphate-kerosene system.

To more fully illustrate the invention the following detailed examples are given.

EXAMPLE 1

Experiments are performed to compare the two component system and the three component system with respect to primary break time and optium contact time (or equilibration time). The following procedure is used: an aqueous sodium tungstate solution having a concentration of about 160 grams of $WO_3$/1 liter is adjusted to a pH of about 2.0 with sulfuric acid. An aqueous solution having a concentration of 1.5 N sulfuric acid is prepared and is used as the solution for making amine salt. Organic solutions having following compositions are prepared: Solution 1-8 percent by volume of Adogen 381—92 percent by volume of SC #150; Solution 2-12 percent by volume of Alamine 336—12 percent by volume of TBP—76 percent by volume of kerosene; Solution 3-12 percent by volume of Alamine 336—12 percent by volume of TBP—76 percent by volume of Kermac 470B. As previously mentioned Adogen 381 is the trade name of an amine with the predominate amine tri-isooctyl amine; TBP is tributyl phosphate; Alamine 336 is the trade name of an amine which is predominately tricapryl amine and Kermac 470B is the trade name of a kerosene supplied by Kerr-McGee.

Amine Salt Making Step

Equal volumes of the sulfuric acid solution and the organic solution are mixed for about 10 minutes. Immediately after mixing stopped, the primary break or primary disengagement time is measured.

Tungsten Extraction Step

Equal volumes of the amine salt and the aqueous sodium tungsten solution are mixed for about 5 minutes. Immediately after mixing is stopped, the primary break of primary disengagement time is measured.

Optimum Contact Time (Equilibration Time)

Equal volumes of the amine salt (the organic phase) and the aqueous sodium tungstate solution are mixed for varying times. After shaking and settling, equal volumes of the organic and aqueous phase are taken and analyzed tungsten content and the extraction efficiency is calculated.

Table 1 shows the results of primary break time and optium contact time.

TABLE 1

| | Primary Break Time/Minutes | |
|---|---|---|
| Extraction System | Amine Salt Making Step | Tungsten Extraction Step |
| 8% Adogen 381–92% SC #150 | 1.0 | 5.4 |
| 12% Alamine 336–12% TBP–76% Kermac 470B | 2.6 | 15.0 |
| 12% Alamine 336–12% TBP–76% Kerosene | 15.3 | 31.0 |

EXAMPLE 2

The following experiment is conducted to compare the two component system and the three component system with respect to sodium contamination and other impurities in the product by operating a three stage mixer—settler extraction unit. A normal alkali tungstate aqueous solution is used as the feed solution. The pH of the solution is adjusted to a pH of about 2.0 with a mineral acid such as sulfuric acid and is used as the feed solution in a solvent extraction process. The feed solutions are contacted with either the two component organic phase (8 percent by volume Adogen 381—92 percent by volume SC 150) or the three component organic phase (12% by volume Alamine 336—12 percent by volume TBP—76 percent by volume Kermac 470B). The raffinate generally contains less than 0.1 g $WO_3$/liter. The tungsten-loaded organic solution is washed with deionized water and contacted with ammonia gas—fortified dilute aqueous solution of ammonium tungstate in a one-stage mixer settler stripping unit. The aqueous solution is collected as high purity ammonium tungstate solution. The barren organic is washed with deionized water and then contacted with 1.5 N $H_2SO_4$. The regenerated organic is then recycled to the extraction circuit. Table 2 shows sodium analysis of the raffinate from two washings of the loaded organic and resulting product.

TABLE 2

| | Sodium Analysis | | |
|---|---|---|---|
| System | Washing 1, g/l | Washing 2, g/l | Ammonium Tungstate Solution, g/l |
| Two Component (8% Adogen 381–92% SC #150) | 0.15 | 0.02 | 0.013 |
| Three Component (12% Alamine 336–12% TBP –76% Kermac 470B) | 6.80 | 0.62 | 0.23 |

TABLE 3

| | Impurity Levels in APT, PPM | | | | | | | | | | | | | | |
|---|---|---|---|---|---|---|---|---|---|---|---|---|---|---|---|
| System | Al | Ca | Cu | Cr | Fe | Mg | Mn | Ni | Si | Sn | Mo | As | P | Na | K |
| Two Component (8% Adogen 381–92% SC #150) | <0.7 | <0.35 | 0.18 | <1.0 | <1.7 | <0.35 | <0.7 | <0.7 | <0.7 | <0.7 | <6.2 | 7 | <7 | <5 | <12 |
| Three Component (12% Alamine 336–12% TBP –76% Kermac 470B) | 1.3 | <0.41 | 0.16 | 4.1 | <0.7 | <0.35 | <0.7 | <0.7 | 1.5 | 3.5 | <5.6 | 20 | 7.6 | 27 | <12 |

Other similar amine materials to those embodied in this invention do not yield the improvement detailed herein. For example, when a tri-isodecyl amine sold under the trade names of Adogen 382 by Ashland Chemical Company or Alamine 313 by General Mills is used in place of Adogen 381 in the above examples the necessary contact time for tungsten extraction step is increased by three fold. Similarly when the tricaprylyl amine (Alamine 336) is used the time necessary for tungsten extraction is also increased by three fold. In each instant the solvent used is SC #150.

Even closely related aromatic solvents do not yield comparable results when used in place of SC #150 in the above examples. A solvent known in the trade as SC #28 and sold by Buffalo Solvents and Chemical Company is a mixture of alkyl benzenes having molecular weights of either 106, 120, 134 or 148. Thus, the total number of carbon atoms in the alkyl groups attached to the benzene ring is either 2, 3, 4 or 5. While some of the same alkyl benzenes are present in both SC 28 and SC #150, SC #28 contains an appreciable amount of ethyl benzene isomers which SC #150 does not. The processing time to form the amine salt when SC #28 is used is increased by about 230% of over the time when SC #150 is used. The tungsten extraction time is at least doubled when SC #28 is substituted for SC #150. As previously mentioned kerosene without tributyl phosphate results in insoluble tungsten amine complex.

While there has been shown and described what are at present considered the preferred embodiments of the invention, it will be obvious to those skilled in the art that various changes and modifications may be made therein without departing from the scope of the invention as defined by the appended claims.

What is claimed is:

1. In a process wherein tungsten values are extracted from an aqueous alkali metal tungstate solution containing impurities by an organic extractant solution containing an amine extractant and thereafter the tungste values are removed from the organic extractant solution by stripping with aqueous ammonia, wherein the improvement comprises providing, as an extractant, an organic extraction solution consisting essentially of from about 6 to about 10 percent by volume of a mixture of tri-alkyl amines having alkyl chains of about 6 to 10 carbon atoms with trisooctyl amine being the major component in said mixture and from about 90 to 94 percent by volume of an aromatic solvent consisting essentially of a mixture of alkyl benzenes wherein the alkyl benzenes constituting the mixture of alkyl benzenes have molecular weights of 120, 134 or 148 and the total number of carbon atoms in the alkyl chains attached to the benzene ring are either 3, 4 or 5.

2. An improvement according to claim 1 wherein the amine constitutes about 8 percent by volume of the extracting solution.